United States Patent
Tamayo et al.

(10) Patent No.: US 7,734,652 B2
(45) Date of Patent: Jun. 8, 2010

(54) NON-NEGATIVE MATRIX FACTORIZATION FROM THE DATA IN THE MULTI-DIMENSIONAL DATA TABLE USING THE SPECIFICATION AND TO STORE METADATA REPRESENTING THE BUILT RELATIONAL DATABASE MANAGEMENT SYSTEM

(75) Inventors: Pablo Tamayo, Hopkinton, MA (US); George G. Tang, Lexington, MA (US); Mark A. McCracken, Belmont, MA (US); Mahesh K. Jagannath, Shrewsbury, MA (US); Marcos M. Campos, Cambridge, MA (US); Boriana L. Milenova, Reading, MA (US); Joseph S. Yarmus, Groton, MA (US); Pavani Kuntala, Lafayette, LA (US)

(73) Assignee: Oracle International Corporation, Redwood Shores, CA (US)

( * ) Notice: Subject to any disclaimer, the term of this patent is extended or adjusted under 35 U.S.C. 154(b) by 1216 days.

(21) Appl. No.: 10/927,083

(22) Filed: Aug. 27, 2004

(65) Prior Publication Data
US 2005/0246354 A1    Nov. 3, 2005

Related U.S. Application Data

(60) Provisional application No. 60/498,700, filed on Aug. 29, 2003.

(51) Int. Cl.
G06F 17/00    (2006.01)
G06F 17/30    (2006.01)

(52) U.S. Cl. .................. 707/792; 707/600; 707/810

(58) Field of Classification Search ............... 707/1–3, 707/9–10, 100–101, 600, 790, 792, 810; 706/45–50
See application file for complete search history.

(56) References Cited

U.S. PATENT DOCUMENTS

| 6,151,414 A | * | 11/2000 | Lee et al. | ............ 382/253 |
| 6,357,041 B1 | * | 3/2002 | Pingali et al. | ............ 717/154 |
| 6,434,544 B1 | * | 8/2002 | Bakalash et al. | ............ 707/2 |

(Continued)

FOREIGN PATENT DOCUMENTS

WO    WO 00/65479    * 11/2000

(Continued)

OTHER PUBLICATIONS

Daniel D Lee et al. "Algorithms for non-negative matrix factorization", 2001, 1-7 pages.*

(Continued)

*Primary Examiner*—Srirama Channavajjala
(74) *Attorney, Agent, or Firm*—Hanify & King, PC

(57) ABSTRACT

An implementation of NMF functionality integrated into a relational database management system provides the capability to apply NMF to relational datasets and to sparse datasets. A database management system comprises a multi-dimensional data table operable to store data and a processing unit operable to perform non-negative matrix factorization on data stored in the multi-dimensional data table and to generate a plurality of data tables, each data table being smaller than the multi-dimensional data table and having reduced dimensionality relative to the multi-dimensional data table. The multi-dimensional data table may be a relational data table.

21 Claims, 6 Drawing Sheets

U.S. PATENT DOCUMENTS

| | | | |
|---|---|---|---|
| 6,629,102 B1* | 9/2003 | Malloy et al. | 707/102 |
| 6,633,882 B1* | 10/2003 | Fayyad et al. | 707/101 |
| 6,907,427 B2* | 6/2005 | Franz et al. | 707/7 |
| 2002/0087516 A1* | 7/2002 | Cras et al. | 707/2 |
| 2002/0091681 A1* | 7/2002 | Cras et al. | 707/3 |
| 2003/0018604 A1* | 1/2003 | Franz et al. | 707/1 |
| 2005/0050087 A1* | 3/2005 | Milenova et al. | 707/102 |
| 2005/0262039 A1* | 11/2005 | Kreulen et al. | 707/1 |
| 2006/0136462 A1* | 6/2006 | Campos et al. | 707/102 |
| 2007/0050356 A1* | 3/2007 | Amadio | 707/5 |
| 2007/0076869 A1* | 4/2007 | Mihcak et al. | 380/54 |
| 2007/0112818 A1* | 5/2007 | Sastry | 707/101 |

FOREIGN PATENT DOCUMENTS

| | | | |
|---|---|---|---|
| WO | WO 01/59602 | * | 8/2001 |
| WO | WO 02/03327 | * | 1/2002 |

OTHER PUBLICATIONS

Tatsushi Ooba, "Stability of multidimensional nonnegative systems",Circuits systems signal process, vol. 19, No. 3, pp. 197-204.*

Tao Feng et al. "local non-negative matrix factorization as a visual representation", proceedings of the 2nd international conference on development and learning (ICDL'02), 2002, pp. 1-6.*

Chenyong Hu1, et al. "Mining Ratio Rules Via Principal Sparse Non-Negative Matrix Factorization", Proceedings of the Fourth IEEE International Conference on Data Mining (ICDM'04).*

Xiaohong Guan et al. "Fast intrusion detection based on a non-negative matrix factorization model", Journal of Network and Computer Applications 32 (2009) 31-44.*

* cited by examiner

NON-NEGATIVE MATRIX FACTORIZATION FROM THE DATA IN THE MULTI-DIMENSIONAL DATA TABLE USING THE SPECIFICATION AND TO STORE METADATA REPRESENTING THE BUILT RELATIONAL DATABASE MANAGEMENT SYSTEM

CROSS-REFERENCE TO RELATED APPLICATIONS

The benefit under 35 U.S.C. §119(e) of provisional application 60/498,700, filed Aug. 29, 2003, is hereby claimed.

BACKGROUND OF THE INVENTION

1. Field of the Invention

The present invention relates to providing an implementation of Non-negative Matrix Factorization functionality integrated into a relational database management system 2. Description of the Related Art Traditionally, as part of standard numerical analysis, matrix factorization is a common preprocessing procedure performed prior to solving a linear system of equations. For data mining, matrix factorization offers a way to reduce the dimensionality of a dataset and extract features that reveal interesting structure in the data or provide inputs to further types of analysis. In matrix factorization, the number of the dataset independent columns is reduced by projection onto a lower dimensional space (e.g. smaller matrices).

This type of rank reduction by factorization can reveal interesting low-dimensional subspaces embedded in large dimensionality datasets space and is a useful operation for pattern discovery and feature extraction. For example, the traditional Principal Component Analysis (PCA) uses a projection of the data on dimensions along which it varies the most and can be used to visualize the most dominant structure in a dataset.

Non-negative matrix factorization (NMF) involves imposing non-negativity constraints on the factors. NMF has been shown to be a useful decomposition and feature extraction method in fields such as object detection and recognition, and to be a valuable alternative to PCA. By forcing a dataset (matrix) to "fit" into a product of smaller datasets (matrices) NMF compresses the data and tends to eliminate some of the redundancies and expose the most common patterns. By using a parts-based or component-based decomposition, and in contrast to PCA and other techniques, the compressed version of the data is more interpretable and can be used to understand interesting patterns and common trends in the dataset. The NMF decomposition also induces a numerical taxonomy that can be used for grouping the rows or columns of the original dataset. The extracted features can be used as inputs to other analysis tasks such as classification or indexing. This procedure has proven useful in face recognition problems and in the discovery of semantic features in texts.

However, there are some limitations on traditional NMF techniques. For example, NMF has traditionally been applied to "flat" or non-relational datasets. This limits the analysis that may easily be performed with NMF. Conventional system require the extraction of data from the database into a statistical package where processing could be performed. This process is complex and not likely to be attempted by the user. This process is also relatively expensive and time consuming to perform. In addition, traditional NMF techniques do not handle "sparse" datasets well and are not applicable to categorical data. This prevents traditional NMF analysis from being efficiently applied to particular types of data, such as textual data. A need arises for a technique by which NMF may be applied to relational datasets, to sparse datasets, and categorical data.

SUMMARY OF THE INVENTION

The present invention provides an implementation of NMF functionality integrated into a relational database management system (RDBMS). It provides the capability to apply NMF to relational datasets, to sparse datasets, and to categorical attributes. The application of NMF to relational data tables in a RDBMS enables the projection of tables into lower dimensionality representations as an analysis application. In this way, it provides a data "decomposition" capability in the database that enables different types of data analysis applications such as feature extraction, profiling, clustering, projection for plotting, etc. The support for sparse tables allows NMF to be used, for example, on document-word matrices that represent text data. In this way, it provides the capability to perform "latent semantic analysis" in the RDBMS. This is an important text mining operation that provides improved indexing of tables and also the creation (and discovery from scratch) of taxonomies for a document corpus.

In one embodiment of the present invention, a database management system comprises a multi-dimensional data table operable to store data and a processing unit operable to perform non-negative matrix factorization on data stored in the multi-dimensional data table and to generate a plurality of data tables, each data table being smaller than the multi-dimensional data table and having reduced dimensionality relative to the multi-dimensional data table. The multi-dimensional data table may be a relational data table.

In one aspect of the present invention, the processing unit comprises a server application programming interface operable to provide an interface to client software, a build unit operable to build a non-negative matrix factorization model from the data in the multi-dimensional data table, and an apply unit operable to apply the non-negative matrix factorization model to the data in the multi-dimensional data table. The build unit may comprise a table function or RDBMS kernel code. The apply unit may comprise a table function or RDBMS kernel code. The build unit may be operable to un-nest nested table columns in the multi-dimensional data table and to explode categorical attributes in the multi-dimensional data table into a series of binary attributes. The apply unit may be operable to un-nest nested table columns in the multi-dimensional data table and to explode categorical attributes in the multi-dimensional data table into a series of binary attributes.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

The present invention provides an implementation of NMF functionality integrated into a relational database management system (RDBMS). This provides the capability to apply NMF to relational datasets, to sparse datasets, and categorical attributes.

Given an N (rows)×M (columns) two-dimensional (2D) dataset V and k<N, M, NMF computes an approximation of the original data V as V~V'=W×H, where W is N by k, and H is k by M. Starting from random initial conditions, W and H are iteratively updated until convergence to a local minimum is achieved, monitored by the minimization of the Euclidean cost function. Alternatively, a divergence cost function can be used. V must have positive entries, and so do W and H by construction. Even though localization is not an explicit property of the algorithm, NMF appears to produce quite localized and sparse features that facilitate the interpretation of results and the transparency of the model. For example, when NMF is applied to a dataset of facial images, the extracted features are facial parts: eyes, noses etc. When the dataset is a document/keyword matrix then NMF extracts "semantic" features.

Figure 1:
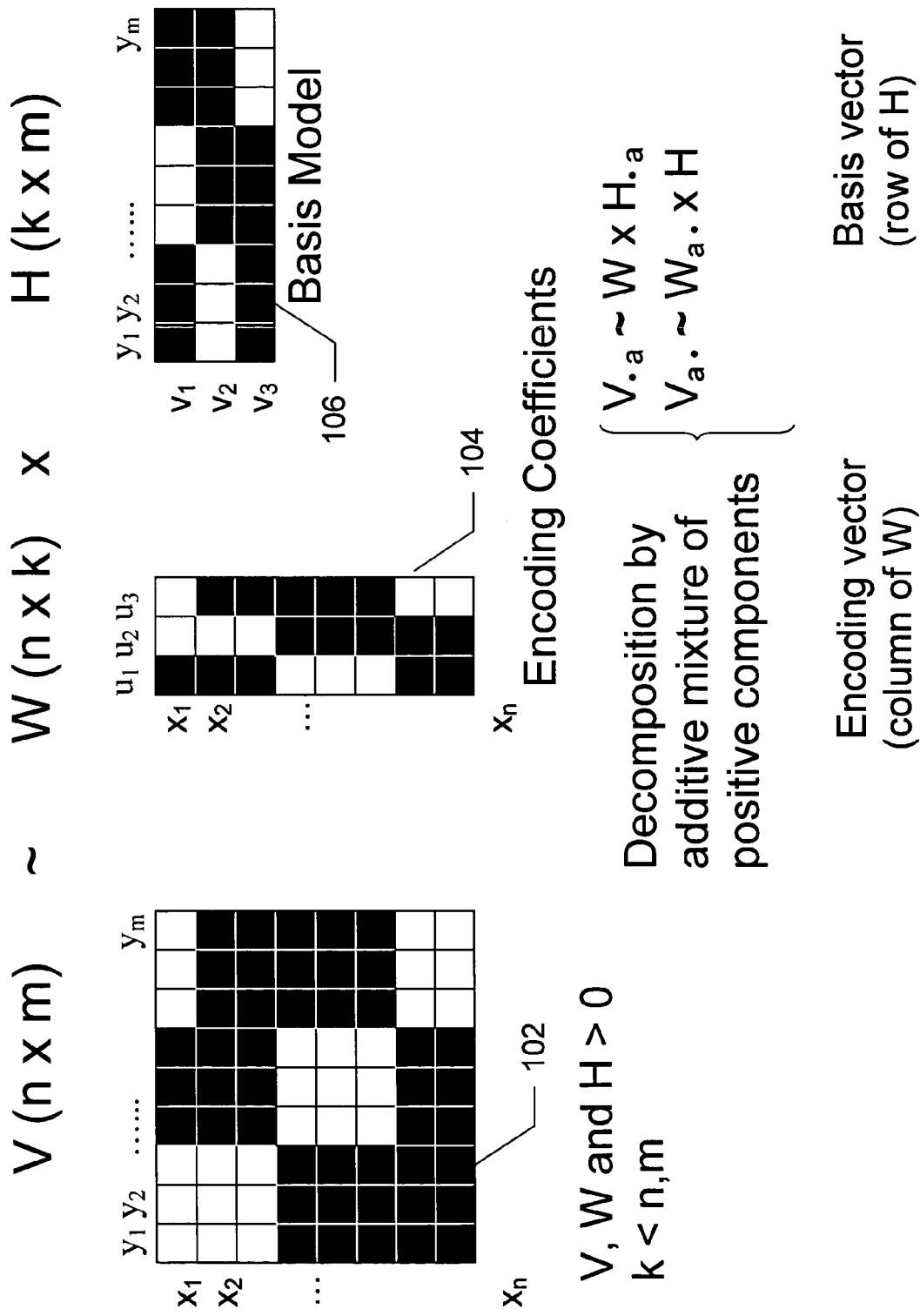
FIG. 1 illustrates an example of the application of NMF to a dataset.

An example of the application of NMF to a dataset is shown in FIG. 1. Dataset V 102 is a 2D dataset having dimensions x and y. V 102 has n entries in the x dimension and m entries in the y dimension. Encoding coefficients W 104 is 2D and has dimensions x and u, with n entries in the x dimension and k entries in the u dimension. Basis model H 106 is 2D and has dimensions v and y, with k entries in the v dimension and m entries in the y direction. NMF constructs approximate factorizations of the input data matrix V [N×M] as V~V'=WH where W and H are two smaller matrices. V must have positive entries, and so do W and H by construction (V, W, and H>0). Starting from non-negative initial conditions of W and H, iterations of the multiplicative update rules converge to a local maximum of the objective function. The dimensions of W and H are N×K and K×M respectively. In general K<<NM, or (N+M) K<NM so that W and H are a "compressed" representation of V. This method uses only additive contributions and therefore avoids cancellations. In particular, decomposition is performed by additive mixture of positive components:

$$\begin{cases} V_{.a} \sim W \times H_{.a} \\ V_{a.} \sim W_{a.} \times H \end{cases}$$

The W and H matrices provide relatively "transparent" compressed representations of the data based on additive components or "parts", that can be used for clustering, feature extraction, low-dimensional projection, latent semantic analysis for text and in general analysis of the intrinsic (unsupervised) structure of a dataset.

NMF can also be viewed as a bi-clustering approach. The features are clusters of attributes and cases. The H matrix provides the clustering of the rows of V and W the assignment or $W^T$ the clustering of the columns of V and $H^T$ the assignment.

Typically N is of the order of 1,000-10,000 (dense matrix), 10,000-1,000,000 (sparse matrix), M is 100-10,000 (dense matrix), 1,000-1,000,000 (sparse matrix) and K is 5-100. The data matrix is typically dense for numerical data and sparse for text.

One starts with random initializations of W and H and then multiplies them and compares them with the original matrix V using a cost function (e.g. Euclidean distance) The process is iterated until the cost function falls below a given threshold or a maximum number of iterations are achieved.

Text Mining involves extracting information from unstructured data. The datasets are high dimensional and sparse. NMF involves factorizing the document-term matrix based on different constraints. One widely used approach for text mining is latent semantic analysis. This algorithm focuses on dimensionality reduction. By comparing the vectors for two adjoining segments of text in a high dimensional semantic space, the method provides a characterization of the degree of semantic relatedness between the segments.

Figure 2:
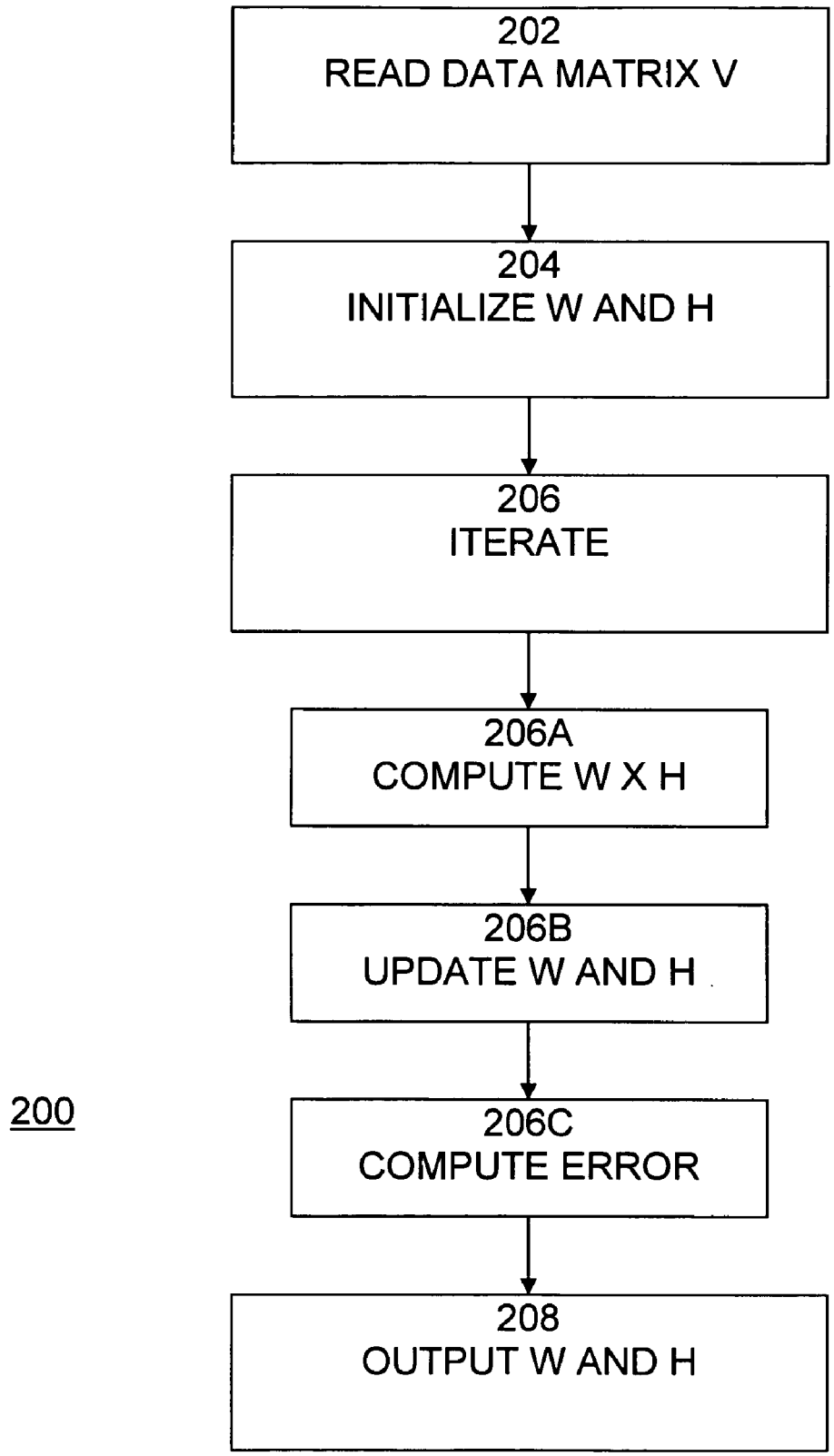
FIG. 2 is an exemplary flow diagram of a process of iteratively generating the factorization matrices W and H.

An example of a process 200 of iteratively generating the factorization matrices W and H is shown in FIG. 2. Process 200 begins with step 202, in which data matrix V is read. In step 204, the factorization matrices W and H are defined and initialized, preferably with a random number in each entry. In step 206, iterations are performed, each iteration including computing the product of W and H (step 206A), updating W and H based on V', the computed product of W and H (step 206B), and computing the error between V', the computed product of W and H, and the original data matrix V (step 206C).

In order to estimate the factorization matrices, a cost function needs to be defined that quantifies the approximation V~V'=WH. Two cost functions are considered for finding optimal non-negative factorizations. One algorithm focuses on minimizing the least square error, while the second one minimizes the generalized Kullback-Leibler divergence.

The Euclidian distance cost function:

$$\|V - WH\|^2 = \sum_{ij}(V_{ij} - (WH)_{ij})^2$$

is preferred because of its simplicity. Further, the convergence can be slow with the divergence approach and is very sensitive to the choice of the step size.

The choice of the update rules used to update W and H in step 206B is based on the cost function such that the iterative update rules converge to a local maximum of the objective function. The multiplicative update rule that is preferred enforces that the Euclidean distance $\|V-WH\|$ is non-increasing under the following update rule:

$$H_{ij} \leftarrow H_{ij}(W^*V)_{ij}/(W^*WH)_{ij} W_{ij} \leftarrow W_{ij}(VH^*)_{ij}/(WHH^*)_{ij}$$

The iterative update is continued until the Euclidean cost function $\|V-W H\|$ crosses a threshold or a maximum number of iterations is achieved (typically 50-200).

Once the iterations are completed, the factorization matrices W and H are output in step 208.

The features discovered by NMF can be grouped together to generate a taxonomy. For example, by running a hierarchical clustering algorithm on the features extracted by NMF, the text documents can be grouped into reasonable cohesive clusters.

Figure 3:
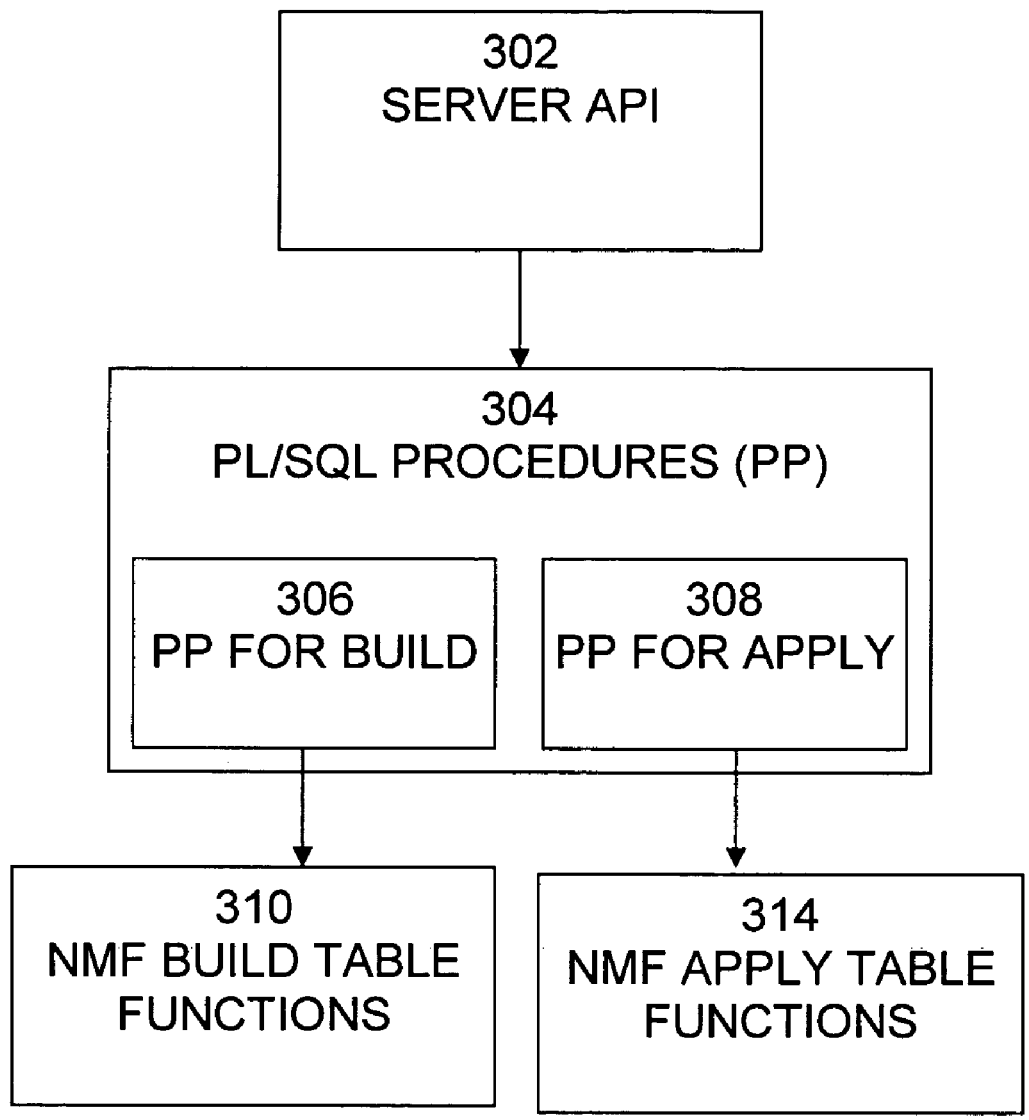
FIG. 3 is exemplary block diagram of an implementation of NMF.

An example of an implementation 300 of NMF, according to the present invention, is shown in FIG. 3. Exemplary implementation 300 includes a server Application Programming Interface (API) 302, PLS/SQL procedures (PP) 304, and NMF table functions 308. The server API 302 for Non-negative Matrix Factorization may be composed of several PL/SQL procedures that allow the user to construct a specification for a Non-negative Matrix Factorization model as the result of a build task. Typical parameters that may be specified include: Number of Iterations for Convergence, Number of Features to be returned, Convergence Factor, and Stopping Criteria used to decide when NMF converged. System defaults may be provided if any parameters are not specified. The outputs from server API 302 are passed to PP 304.

PP 304 includes two main functions—PP for build 306 and PP for apply 308. PP 304 for the build process acts as a wrapper to the Table Function routines 308 for Non-negative Matrix Factorization model build and basically performs preprocessing of input data. The build PL/SQL procedure may be invoked with parameters such as the table name for build input data, the name of the mining function the build function is to use to build the Non-negative Matrix Factorization model, the name to be given to the model when persisting the model, and the required mining function settings and algorithm settings.

Figure 4:
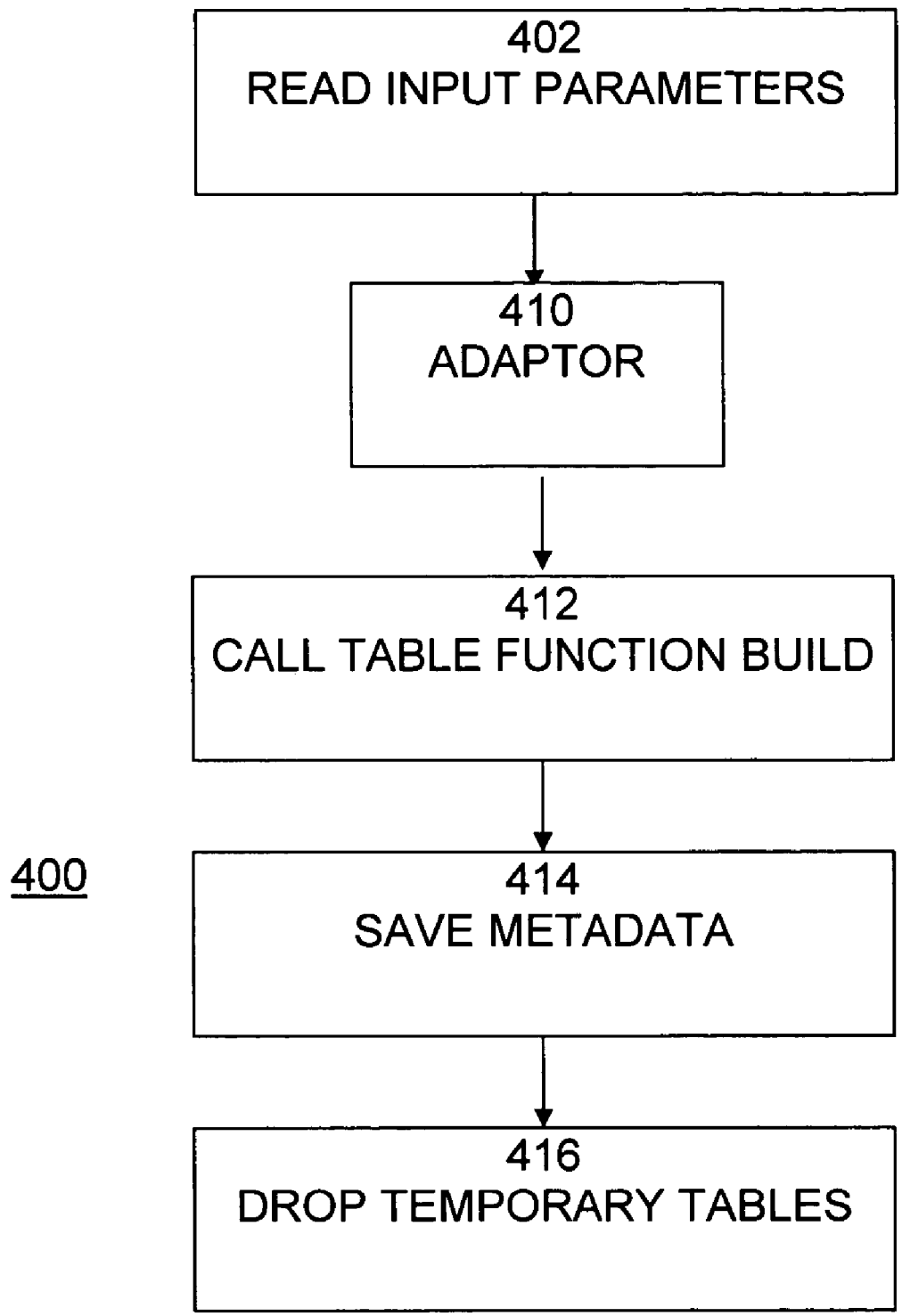
FIG. 4 is an exemplary flow diagram of a process of building an NMF model.

The PL/SQL procedure 304 for build may perform processing 400 such as that shown in FIG. 4. Processing 400 begins with step 402, in which input parameters, such as data mining function settings are read. In step 410, un-nesting nested columns, mapping attributes, and exploding categorical attributes prepare the filtered input data table. In step 412, a Table Function build routine is called to build an NMF model. In step 414, the metadata resulting from the model build is saved to the RDBMS. In step 416, the temporary tables used by the adaptor module 410 are dropped.

The PP for the apply process acts as a wrapper to the NMF Apply Table Function.

Figure 5:
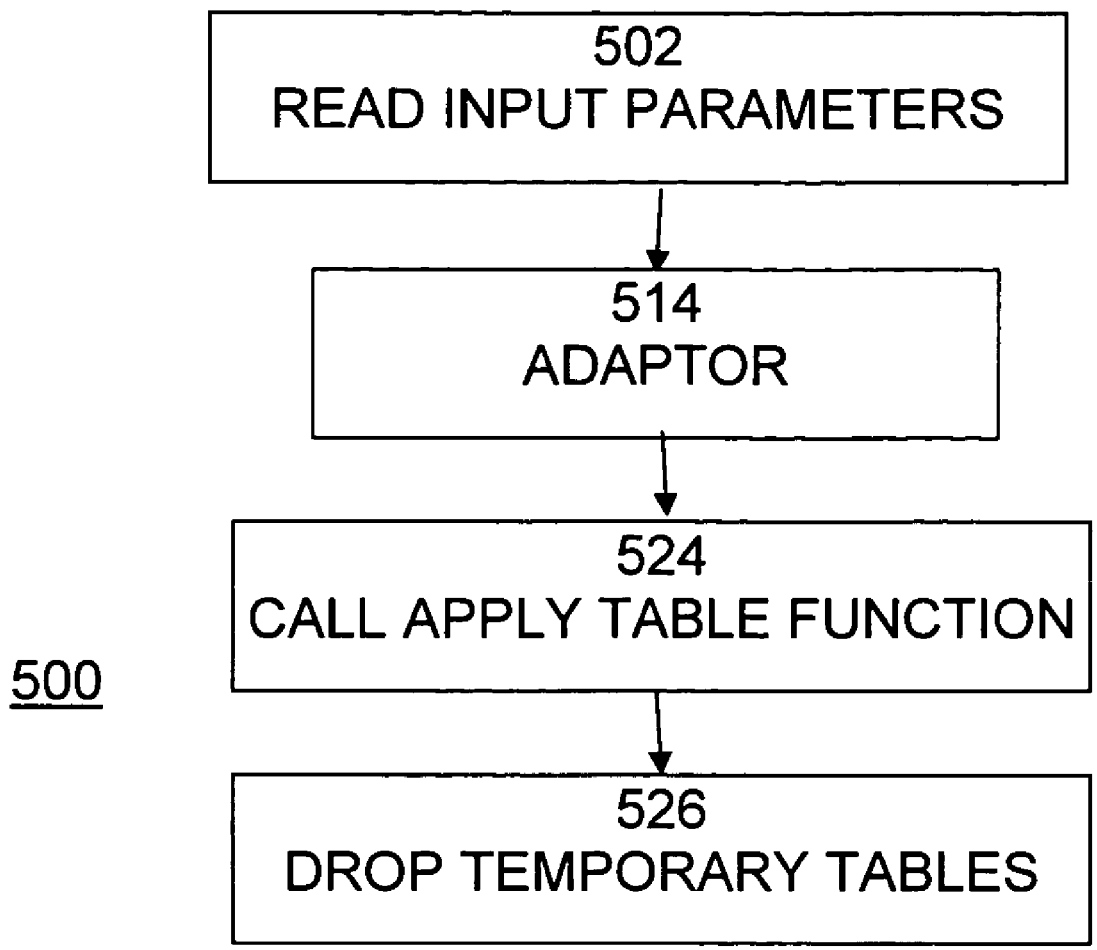
FIG. 5 is an exemplary flow diagram of a process of applying an NMF model.

The PP procedure 304 for apply may perform processing 500 such as that shown in FIG. 5. Processing 500 begins with step 502, in which input parameters, such as the table name for apply input data, the name of the model upon which the apply function is to be performed, and the name of the output table, are read In step 514, the filtered input table data categorical attributes are exploded into a set of binary columns, nested table columns are un-nested, and the attributes are mapped to numbers, if necessary. In step 524, the apply table function routine is called to apply the NMF model. In step 526, the temporary tables created by the adaptor module are dropped.

Figure 6:
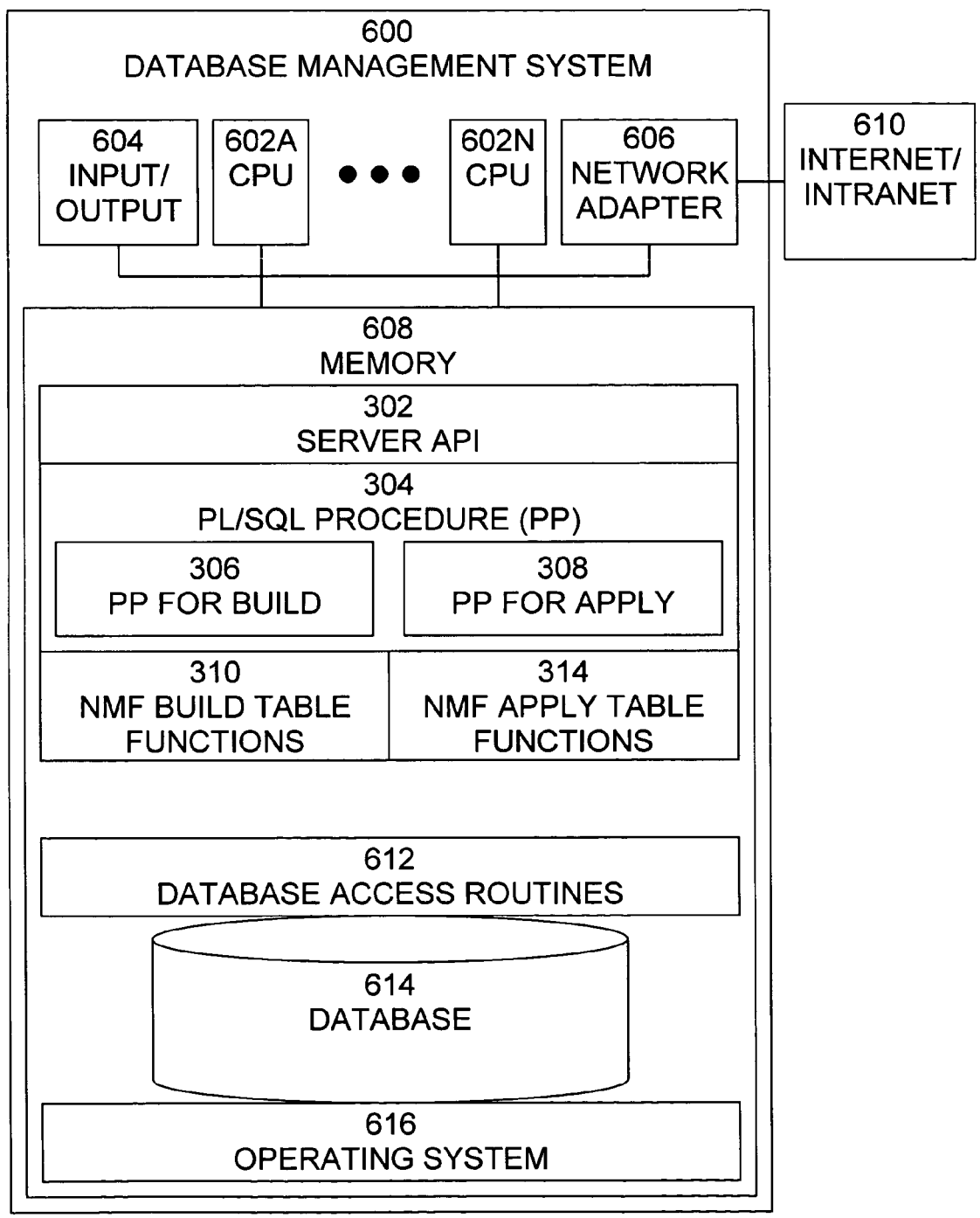
FIG. 6 is an exemplary block diagram of a database management system in which the present invention may be implemented.

An exemplary block diagram of a database management DBMS 600 is shown in FIG. 6. DBMS 600 is typically a programmed general-purpose computer system, such as a personal computer, workstation, server system, and minicomputer or mainframe computer. DBMS 600 includes one or more processors (CPUs) 602A-602N, input/output circuitry 604, network adapter 606, and memory 608. CPUs 602A-602N execute program instructions in order to carry out the functions of the present invention. Typically, CPUs 602A-602N are one or more microprocessors, such as an INTEL PENTIUM® processor. FIG. 6 illustrates an embodiment in which DBMS 600 is implemented as a single multi-processor computer system, in which multiple processors 602A-602N share system resources, such as memory 608, input/output circuitry 604, and network adapter 606. However, the present invention also contemplates embodiments in which DBMS 600 is implemented as a plurality of networked computer systems, which may be single-processor computer systems, multi-processor computer systems, or a mix thereof.

Input/output circuitry 604 provides the capability to input data to, or output data from, database/DBMS 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces database/DBMS 600 with Internet/intranet 610. Internet/intranet 610 may include one or more standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the functions of DBMS 600. Memory 608 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 608 varies depending upon the functions that DBMS 600 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 6, memory 608 includes server API 302, PL/SQL procedures 304, PP for build 306, PP for apply 308, NMF build table functions 310, NMF apply table functions 314, database access routines 612, database 614, and operating system 616. Server API 302 provides a programming interface to client software. PP 304 includes two main functions—PP for build 306 and PP for apply 308. PP for build 306 acts as a wrapper to the Table Function routines 310 for Non-negative Matrix Factorization model build and basically performs preprocessing of input data. The PP for apply acts as a wrapper to the NMF Apply Table Functions 314. Database access routines 612 provide the capability to access one or more databases, such as those included in database 614, in order to retrieve information for display. Database 614 provides the capability to store, organize, modify, and extract information from one or more data tables included in database 614. Operating system 628 provides overall system functionality.

From a technical standpoint, databases can differ widely. The terms relational, network, flat, and hierarchical all refer to the way a database organizes information internally. The internal organization can affect how quickly and flexibly you can extract information.

Each database includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

As shown in FIG. 6, the present invention contemplates implementation on a system or systems that provide multiprocessor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms. Examples of computer readable media include recordable-type media such as floppy disc, a hard disk drive, RAM, and CD-ROM's.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A database management system comprising:
a processor to execute computer program instructions and process data;
a memory to store the computer program instructions executable by the processor and a multi-dimensional data table to store data; and
computer program instructions stored in the memory and executable to generate a plurality of data tables from the data stored in the multi-dimensional data table using non-negative matrix factorization, wherein each one of the plurality of data tables is an approximate factor of the multi-dimensional data table; wherein the computer program instructions are further executable to implement:
a server application programming interface to provide an interface to client software to construct a specification for a relational database model including non-negative matrix factorization model as the result of a build task performed by a build unit;
the build unit to build the relational database model including non-negative matrix factorization from the data in the multi-dimensional data table using the specification and to store metadata representing the built relational database model including non-negative matrix factorization in a database; and
an apply unit to apply the relational database model including non-negative matrix factorization stored in the database to the data in the multi-dimensional data table, wherein at least one of the build unit and the apply unit is operable to un-nest nested table columns in the multi-dimensional data table and to explode categorical attributes in the multi-dimensional data table into a series of binary attributes.

2. The database management system of claim 1, wherein the multi-dimensional data table is a relational data table.

3. The database management system of claim 1, wherein the build unit comprises a table function.

4. The database management system of claim 1, wherein the build unit comprises kernel code.

5. The database management system of claim 1, wherein the apply unit comprises a table function.

6. The database management system of claim 1, wherein the apply unit comprises kernel code.

7. The database management system of claim 1, wherein the multi-dimensional data table is a relational data table.

8. A method of operating a database management system comprising a processor to execute computer program instructions and process data, a memory to store the computer program instructions executable by the processor and computer program instructions stored in the memory and executable to perform the steps of:
storing data in a multi-dimensional data table; and generating a plurality of data tables from the data stored in the multi-dimensional data table using non-negative matrix factorization, wherein each one of the plurality of data tables is an approximate factor of the multi-dimensional data table;

providing a server application programming interface to provide an interface to client software to construct a specification for a relational database model including non-negative matrix factorization as the result of a build task;

performing a build task to build the relational database model including non-negative matrix factorization from the data in the multi-dimensional data table using the specification and to store metadata representing the built relational database model including non-negative matrix factorization in a database; and performing an apply task to apply the relational database model including non-negative matrix factorization stored in the database to the data in the multi-dimensional data table, wherein at least one of the building step and the applying step comprises:

un-nesting nested table columns in the multi-dimensional data table; and exploding categorical attributes in the multi-dimensional data table into a series of binary attributes.

9. The method of claim 8, wherein the multi-dimensional data table is a relational data table.

10. The method of claim 9, wherein the non-negative matrix factorization model is built using a table function.

11. The method of claim 9, wherein the non-negative matrix factorization model is built using kernel code.

12. The method of claim 9, wherein the non-negative matrix factorization model is applied using a table function.

13. The method of claim 9, wherein the non-negative matrix factorization model is applied using kernel code.

14. The method of claim 9, wherein the multi-dimensional data table is a relational data table.

15. A computer program product for operating a database management system comprising a processor to execute computer program instructions and process data, and a memory to store the computer program instructions executable by the processor, the computer program product comprising a computer readable recordable-type storage medium, and computer program instructions, recorded on the computer readable recordable-type storage medium, executable by a processor, for performing the steps of:

storing data in a multi-dimensional data table; and generating a plurality of data tables from the data stored in the multi-dimensional data table using non-negative matrix factorization, wherein each one of the plurality of data tables is an approximate factor of the multi-dimensional data table;

providing a server application programming interface to provide an interface to client software to construct a specification for a relational database model including non-negative matrix factorization as the result of a build task;

performing a build task to build the relational database model including non-negative matrix factorization from the data in the multi-dimensional data table using the specification and to store metadata representing the built relational database model including non-negative matrix factorization in a database; and performing an apply task to apply the relational database model including non-negative matrix factorization stored in the database to the data in the multi-dimensional data table, wherein at least one of the building step and the applying step comprises:

un-nesting nested table columns in the multi-dimensional data table; and exploding categorical attributes in the multi-dimensional data table into a series of binary attributes.

16. The computer program product of claim 15, wherein the multi-dimensional data table is a relational data table.

17. The computer program product of claim 15, wherein the non-negative matrix factorization model is built using a table function.

18. The computer program product of claim 15, wherein the non-negative matrix factorization model is built using kernel code.

19. The computer program product of claim 15, wherein the non-negative matrix factorization model is applied using a table function.

20. The computer program product of claim 15, wherein the non-negative matrix factorization model is applied using kernel code.

21. The computer program product of claim 15, wherein the multi-dimensional data table is a relational data table.

* * * * *

UNITED STATES PATENT AND TRADEMARK OFFICE
CERTIFICATE OF CORRECTION

| | |
|---|---|
| PATENT NO. | : 7,734,652 B2 |
| APPLICATION NO. | : 10/927083 |
| DATED | : June 8, 2010 |
| INVENTOR(S) | : Pablo Tamayo et al. |

It is certified that error appears in the above-identified patent and that said Letters Patent is hereby corrected as shown below:

In column 1, line 20, delete "system" and insert -- system. --, therefor.

In column 4, line 66, delete "PLS/SQL" and insert -- PL/SQL --, therefor.

Signed and Sealed this
Second Day of August, 2011

David J. Kappos
*Director of the United States Patent and Trademark Office*